United States Patent [19]

Takeshita

[11] Patent Number: 4,764,820

[45] Date of Patent: Aug. 16, 1988

[54] PICTURE ELEMENT ARRANGING METHOD IN VIDEO DATA RECORDING-REPRODUCING SYSTEM

[75] Inventor: Kazuyuki Takeshita, Hachioji, Japan

[73] Assignee: Hitachi Denshi Kabushiki Kaisha, Tokyo, Japan

[21] Appl. No.: 825,601

[22] Filed: Feb. 3, 1986

[30] Foreign Application Priority Data

Feb. 4, 1985 [JP] Japan .................................. 60-18569

[51] Int. Cl.⁴ ........................... G11B 5/02; H04N 5/78
[52] U.S. Cl. ........................................ 360/22; 360/32; 360/33.1
[58] Field of Search .................. 360/22, 32, 38.1, 33.1; 358/336, 314

[56] References Cited

U.S. PATENT DOCUMENTS

| 4,138,741 | 2/1979 | Hedlund et al. | 360/77 X |
| 4,329,708 | 5/1982 | Yamamoto et al. | 360/38.1 X |
| 4,353,090 | 10/1982 | Broadbent | 358/342 |
| 4,361,849 | 11/1982 | Bolger | 358/342 X |
| 4,392,162 | 7/1983 | Yamamoto | 360/22 X |
| 4,622,598 | 11/1986 | Doi et al. | 360/22 |

OTHER PUBLICATIONS

"An Experimental Digital Videotape Recorder", Yokogama et al., SMPTE Journal, No. 3, vol. 89, Mar. 80, pp. 173-180.

"Digital Video Recording-Some Experimental and Future Considerations", Morizono et al., SMPTE Journal, vol. 89, Sep. 80, pp. 658-662.

*Primary Examiner*—Aristotelis M. Psitos
*Attorney, Agent, or Firm*—Antonelli, Terry & Wands

[57] ABSTRACT

A video data recording/reproduction method used in a VTR, wherein distribution of picture elements into channels is altered for each field or frame so that the same picture element arrangement produced by interpolation does not continue in successive fields or frames, and wherein information indicating the type of picture element arrangement is recorded together with the video data. The method is intended to perform interpolative correction for still picture portions without sacrificing the resolution, while retaining the editing functions in units of field or frame, whereby degradation of a reproduced picture can be minimized.

4 Claims, 2 Drawing Sheets

○ : CHA

× : CHB ----- FAULTY CHANNEL fs : SAMPLING FREQUENCY

PICTURE ELEMENT ARRANGING METHOD IN VIDEO DATA RECORDING-REPRODUCING SYSTEM

BACKGROUND OF THE INVENTION

1. Field of the Invention

This invention relates to a video data recording-playback method for recording and reproducing video signals separately in a plurality of channels in a recording apparatus such as a video tape recorder (VTR), with the intention of minimizing the deterioration of a reproduced picture caused by any channel system failure due to head jamming or the like.

2. Description of the Prior Art

The conventional picture element division method for the component recording digital VTR is designed uniquely for each field, and therefore if one of the recording-playback channels has failed due to head jamming or the like, the faulty channel is relieved by the interpolation process using the adjacent picture elements.

FIG. 2 is a diagram explaining the interpolation process using the adjacent picture elements in the digital VTR, and FIG. 3 is a diagram explaining the space frequency characteristics. In FIG. 2, failure of channel B as shown by symbol "x" is interpolated by channel A as shown by symbol "o", and the faulty data is replaced with the interpolated value. In this case, the space frequency characteristics in the diagonal direction are halved as shown in FIG. 3 where $f_s$ is the sampling frequency. The hatched area 1 signifies the space frequency characteristics after interpolation, while the blank area 2 signifies the lost diagonal resolution component. Accordingly, the reproduced picture will include unarranged lines on a sample on every other line in the diagonal direction, and it is visible as degraded resolution.

SUMMARY OF THE INVENTION

An object of this invention is to eliminate the above-mentioned deficiency and to retain the resolution at least for still portions of a picture.

In order to achieve the above objective, the inventive method is designed such that the distribution of the picture elements to each channel is changed for every field or frame so that the same picture element interpolation does not continue in fields or frames, thereby retaining the diagonal resolution 2 which is lost in FIG. 3 at least for still picture portions, and information indicating the type of picture element arrangement is recorded together so that the picture elements are not misarranged when the picture is edited in units of field.

Channel replacement can cause the degradation of picture, such as a doubled image at the edge section, and therefore the arrangement information needs to be protected by error correction or by means of a flywheel counter. Degradation of resolution in moving picture portions is not much visible for the human eye, and it does not raise any problem.

BRIEF DESCRIPTION OF THE DRAWINGS

A preferred embodiment of the present invention will now be described by making reference to the accompanying drawings, in which.

DESCRIPTION OF THE PREFERRED EMBODIMENT

Figure 1:
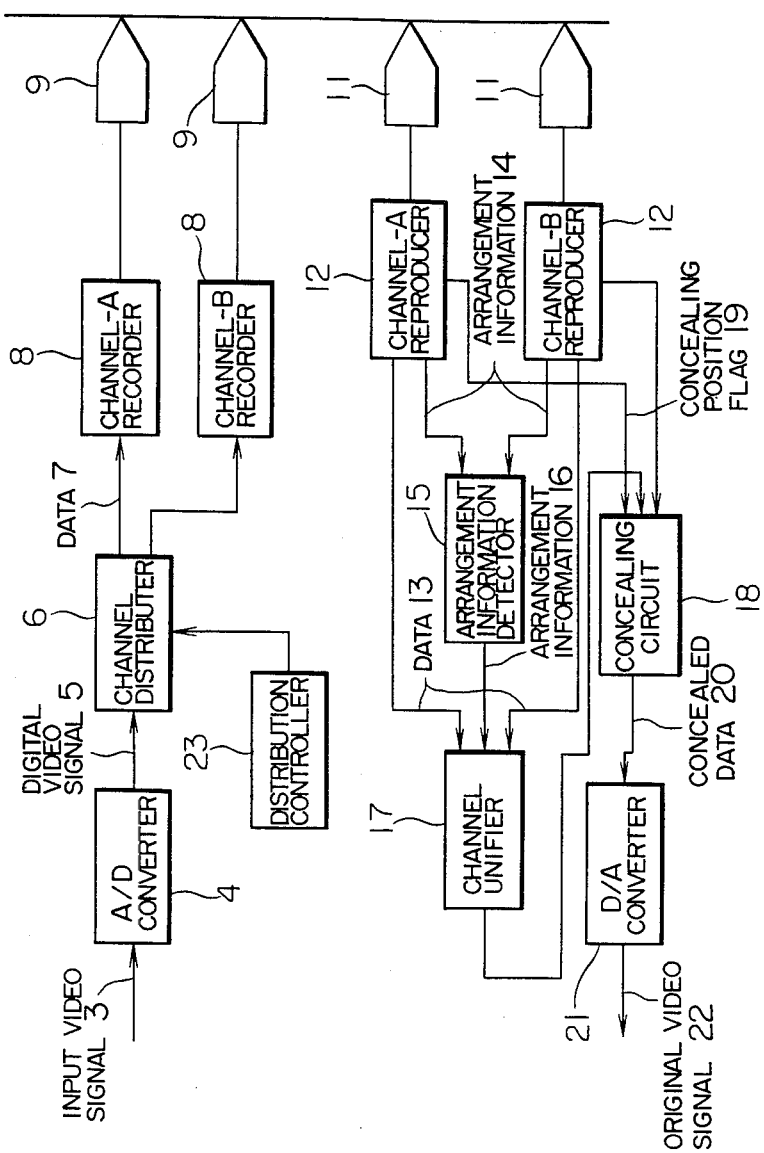
FIG. 1 is a block diagram showing an embodiment of this invention.

FIG. 1 is a block diagram showing an embodiment of this invention, in which an input video signal 3 is transformed into a digital video data 5 by an A/D converter 4 and it is fed to a channel distributer 6 which is controlled by a distribution controller 23. The channel distributer 6 separates channel A and channel B as shown by "o" and "x" in FIG. 2, i.e., channel A is assigned to "o"s position for an even frame and to "x"s position for an odd frame alternately, with the arrangement information being attached to data, e.g., after the sync data, of each channel. The data 7 are formed in the error correcting codes by channel recorders 8 provided for channels A and B, and they are recorded separately for each channel by respective heads 9 on a tape 10. In reproduction, recorded data are picked up by playback heads 11 and, after being error-corrected by channel reproducers 12 provided separately for channels A and B, they are reproduced as data 13. The channel reproducers 12 also recover the arrangement information 14 and the correspondence between the picture element arrangement and the channel is identified by an arrangement information detector 15. The data provided by the detector 15 is buffered by a flywheel counter (not shown) and delivered as the arrangement information 16 to a channel unifier 17 together with the data 13. The channel unifier 17 recovers the original arrangement of the picture elements and delivers the result to a concealing circuit 18. In this circuit, a portion which is unrecoverable in one of channel A or B is interpolated to a mean value of the adjacent picture elements in accordance with a concealing position flag 19 detected by the error correction circuit. The concealed data 20 is reformed into the original video signal 22 by a D/A converter 21 and sent out of the system.

Although the 2-channel system has been described for the sake of simplicity, the number of channels is arbitrary (more than one), and a higher-order channel system is merely accompanied by an increased type of arrangement and a different method of interpolation using adjacent data.

Although in the above embodiment the picture element arrangement is altered in every frame, it may be altered in every field. In addition, in the case of N channels division, arrangements of N in number may be looped or repeated so that it completes by N fields or may be looped or repeated in N frames. In this case, data is needed for indicating the type of arrangement so that the continuity of data is retained for editing in units of field or frame. This information may be substituted by the field number (1−N).

Figure 2:
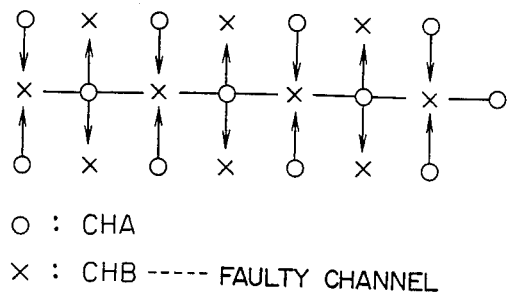
FIG. 2 is a diagram explaining the picture element interpolation process employed in the prior art and also in this invention.
Figure 3:
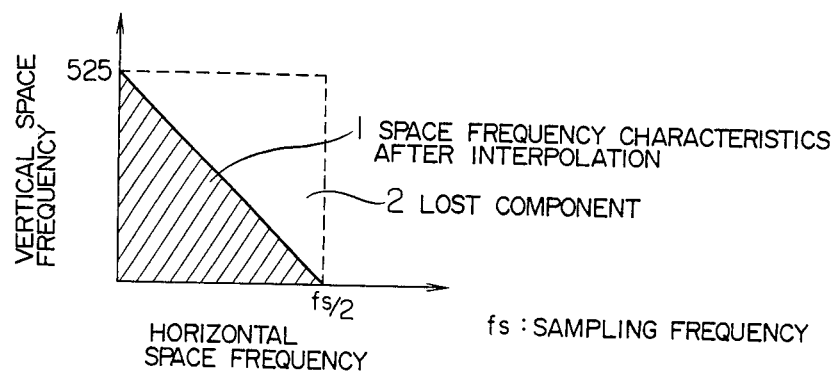
FIG. 3 is a diagram explaining the space frequency characteristics of the prior art and also of this invention.

By interchanging the correspondence of channels and "o" and "x" in FIG. 2 between fields or frames, still portions of a picture can completely be reproduced through the interpolation process between fields or frames for the lost component 2 in FIG. 3.

For the protection of information, the method described in Japanese Unexamined Utility Model Publication No. 141451/82 entitled "DATA PROTECTION CIRCUIT" may be employed. This protection method is intended to detect the inconsistency between the latched input signal and the output of a self-running counter which resets the contents if inconsistent events have occurred more than a certain number of times so that a phase deviation is pulled-in quickly without responding to erroneous input signals of the data reproduction circuit.

Although the effects for the failure of a head or a corresponding channel have been described, the inventive method is also useful for alleviating defects in a wide portion of missing signals, i.e. a noise band, as in the variable-speed playback mode. The correspondance of the picture elements is altered in every N fields, and the corresponding picture elements do not need to be adjacent for each field.

As described above, the inventive method is superior in recovering the resolution of still picture portions by interpolation, while retaining the editing functions in units of field or frame.

I claim:

1. A method of recording and reproducing video data comprising the steps of sampling video data, digitizing the sampled data, dividing the digitized data into a plurality of channels, recording the channels in parallel, and thereafter reproducing the channels, wherein the method further comprises the steps of generating recording and reproducing arrangement information identifying a field for N kinds of correspondence between picture element arrangements and channels for each field together with the video data and being different for each consecutive field, and generating information indicative of the correspondence between the picture element arrangements and channels in a period of N field, where N is a natural number larger than or equal to two.

2. A video data recording and reproducing method according to claim 1 comprising:
   converting by an A/D converter an input video signal into a digital video data;
   dividing by a channel distributer said digital video data into a plurality of channels;
   composing by a channel recorder each channel data into an error correcting code and recording said code on a tape by means of a recording head;
   recovering by a channel reproducer each channel data recorded on said tape by means of a reproduction head and reproducing the data and arrangement information;
   detecting by an arrangement information detector said arrangement information to know the correspondence between the picture element arrangement and channel;
   receiving by a channel unifier the arrangement information from said arrangement information detector and data from each channel reproducer, and restoring the original picture element arrangement;
   receiving by a concealing circuit the output of said channel unifier and implementing concealing data for the output; and
   converting by a D/A converter the concealing data into the original video signal.

3. A method of recording and reproducing video data comprising the steps of sampling video data, digitizing the sampled data, dividing the digitized data into a plurality of channels, recording the channels in parallel, and thereafter reproducing the channels, wherein the method further comprises the steps of generating recording and reproducing arrangement information identifying a frame for N kinds of correspondence between picture element arrangements and channels for each frame together with the video data and being different for each consecutive frame, and generating information indicative of a repetition of the correspondence between the picture element arrangements and channels in a period of N frames, where N is a natural number larger than or equal to two.

4. A video data recording and reproducing method according to claim 3 comprising:
   converting by an A/D converter an input video signal into a digital vide data;
   dividing by a channel distributer said digital video data into a plurality of channels;
   composing by a channel recorder each channel data into an error correcting code and recording said code on a tape by means of a recording head;
   recovering by a channel reproducer each channel data recorded on said tape by means of a reproduction head and reproducing the data and arrangement information;
   detecting by an arrangement information detector said arrangement information to know the correspondence between the picture element arrangement and channel;
   receiving by a channel unifier the arrangement information from said arrangement information detector and data from each channel reproducer, and restoring the original picture element arrangement;
   receiving by a concealing circuit the output of said channel unifier and implementation concealing data for the output; and
   converting by a D/A converter the concealing data into the original video signal.

* * * * *